(12) United States Patent
Kwon

(10) Patent No.: US 9,343,782 B2
(45) Date of Patent: May 17, 2016

(54) APPARATUS FOR BATTERY SAFETY

(71) Applicant: LG CHEM, LTD., Seoul (KR)

(72) Inventor: Dong-Keun Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/760,942

(22) PCT Filed: Jun. 3, 2014

(86) PCT No.: PCT/KR2014/004967
§ 371 (c)(1),
(2) Date: Jul. 14, 2015

(87) PCT Pub. No.: WO2014/196808
PCT Pub. Date: Dec. 11, 2014

(65) Prior Publication Data
US 2015/0357681 A1 Dec. 10, 2015

(30) Foreign Application Priority Data

Jun. 7, 2013 (KR) .................. 10-2013-0065328
Jun. 3, 2014 (KR) .................. 10-2014-0067788

(51) Int. Cl.
*H01M 10/625* (2014.01)
*H01M 10/42* (2006.01)
(Continued)

(52) U.S. Cl.
CPC .............. *H01M 10/425* (2013.01); *H01M 2/34* (2013.01); *H01M 10/42* (2013.01); *H01M 10/48* (2013.01); *H01M 10/5016* (2013.01); *H01M 10/613* (2015.04); *H01M 10/625* (2015.04); *H01M 10/6563* (2015.04); *H01M 10/6572* (2015.04); *H01M 8/04664* (2013.01); *H01M 2010/4271* (2013.01); *H01M 2200/00* (2013.01); *H01M 2220/20* (2013.01)

(58) Field of Classification Search
CPC ............ H01M 8/04664; H01M 10/42; H01M 210/4271; H01M 10/5016; H01M 2220/20
USPC ............................................... 429/9
See application file for complete search history.

(56) References Cited

U.S. PATENT DOCUMENTS

2012/0070706 A1* 3/2012 Miyazaki ............... B60L 1/003
429/61
2012/0150393 A1 6/2012 Knight-Newbury et al.

FOREIGN PATENT DOCUMENTS

JP 5-276677 A 10/1993
JP 2007-8411 A 1/2007
KR 20-1998-0013259 U 6/1998
KR 20-1998-0022914 A 7/1998
(Continued)

OTHER PUBLICATIONS

International Search Report, issued in PCT/KR2014/004967, dated Oct. 13, 2014.
Written Opinion of the International Searching Authority, issued in PCT/KR2014/004967, dated Oct. 13, 2014.

*Primary Examiner* — Basia Ridley
*Assistant Examiner* — James Erwin
(74) *Attorney, Agent, or Firm* — Birch, Stewart, Kolasch & Birch, LLP

(57) ABSTRACT

The present disclosure discloses a battery safety apparatus. The battery safety apparatus according to the present disclosure measures a voltage of a battery in the event of vehicle collision, and when the voltage is higher than a reference voltage value, that it, when the battery is charged over a reference charge amount, discharges the battery and at the same time cools the battery using a cooling device.

10 Claims, 2 Drawing Sheets

(51) Int. Cl.
*H01M 10/48* (2006.01)
*H01M 2/34* (2006.01)
*H01M 10/613* (2014.01)
*H01M 10/6563* (2014.01)
*H01M 10/6572* (2014.01)
*H01M 8/04* (2016.01)

(56) References Cited

FOREIGN PATENT DOCUMENTS

| KR | 10-0552527 B1 | 2/2006 |
| KR | 10-2012-0042986 A | 5/2012 |

\* cited by examiner

APPARATUS FOR BATTERY SAFETY

TECHNICAL FIELD

The present disclosure relates to a battery safety apparatus, and more particularly, to an apparatus that prevents ignition or explosion of a battery in the event of vehicle collision.

The present application claims priority to Korean Patent Application No. 10-2013-0065328 filed in the Republic of Korea on Jun. 7, 2013 and Korean Patent Application No. 10-2014-0067788 filed in the Republic of Korea on Jun. 3, 2014, the disclosures of which are incorporated herein by reference.

BACKGROUND ART

Recently, with exhaustion of fossil energy and concern about environmental pollution, there is an increasing interest in electric products that work on electrical energy, not fossil energy.

Hence, with the increasing development and consumption of mobile devices, electric vehicles, hybrid vehicles, power storage systems, uninterrupted power supplies, or the like, the consumption of secondary batteries as an energy source are drastically increasing and their demands are diverse. To satisfy various demands, studies are actively being conducted on batteries composed of secondary cells.

Meanwhile, high voltage and large capacity batteries are required for electric vehicles or hybrid vehicles. Thus, a high voltage and large capacity battery mounted in a vehicle has an explosion hazard from an accident such as vehicle collision. That is, there is a concern about not only a direct damage caused by vehicle collision but also a secondary accident occurring from collision, for example, ignition or explosion of a battery. Particularly, electric vehicles or hybrid vehicles using high voltage and large capacity batteries have a greater risk of battery ignition or explosion. Accordingly, solutions to battery explosion in the event of vehicle collision have been proposed in the battery-related technical field.

As a related art, Korean Patent Publication No. 10-2012-0042986 discloses an automotive battery safety system. The automotive battery safety system is characterized in that battery safety equipment is activated when vehicle collision is sensed. The battery safety equipment described in the related art discloses i) a battery cooling device using compressed gas, ii) a device which electrically separates a battery, and iii) a discharge resistor.

However, i) the battery cooling device using compressed gas needs a separate gas tank and has a disadvantage of having to periodically check the gas pressure. Also, an amount of compressed gas stored may be insufficient for cooling based on the capacity of the gas tank. ii) The battery separation device has a disadvantage of being unable to control a vehicle after a collision accident because it completely separates a battery. iii) The discharge resistor needs a time to discharge a battery during which the battery cannot be cooled.

A variety of traditional battery safety systems have been disclosed, but have the above disadvantages. Particularly, the battery safety system using the cooling device according to the related art has a risk of explosion during cooling when the battery maintains a high voltage and a large capacity, and the battery safety system using the discharge resistor is problematic in that the battery has an ignition or explosion hazard due to being unable to cool rapidly.

Therefore, there is a need for research on a new type of battery safety apparatus that cools a battery, and at the same time, reduces a voltage and/or a capacity of the battery in the event of a car accident such as vehicle collision.

DISCLOSURE

Technical Problem

The present disclosure is designed to solve the problem of the related art, and therefore, the present disclosure is directed to providing a battery safety apparatus that may cool a battery and at the same time, discharge the battery when a car accident occurs.

Technical Solution

To achieve the above object, a battery safety apparatus according to one aspect of the present disclosure includes a voltage sensor unit to measure a voltage of a battery mounted in a vehicle, a cooling device connected to both ends of the battery and supplied with power from the battery to cool the battery, a switch unit connected between the cooling device and the battery and turning on or off by a control signal, and a control unit to output a control signal to turn on the switch unit when a collision value inputted from the outside is higher than or equal to a preset reference collision value and a voltage value received from the voltage sensor unit is higher than or equal to a preset reference voltage value.

The cooling device may cool the battery and at the same time discharge the battery.

Also, the cooling device may include a cooling fan.

Also, the cooling device may include a thermoelectric element.

Preferably, the thermoelectric element may be disposed such that a cool air emitting side faces the battery.

The collision value inputted from the outside may be outputted from a vehicle control device.

Also, the collision value inputted from the outside may be outputted from a collision detecting sensor attached to the vehicle.

Also, the collision value inputted from the outside may be outputted from an airbag operating sensor attached to the vehicle.

The control unit may turn off the switch unit when the voltage value received from the voltage sensor unit is less than or equal to the preset reference voltage value after the control unit turns on the switch unit.

The battery safety apparatus may further include a memory unit to store the reference collision value and the reference voltage value.

Advantageous Effects

According to one aspect of the present disclosure, the cooling device is connected to both ends of the battery and operates with power supplied from the battery, and the cooling device not only serves to cool the battery, but also serves as a discharge resistor which discharges the battery. Thus, the present disclosure may prevent ignition or explosion through cooling, and may reduce a risk of ignition or explosion by reducing an output and/or a charge capacity of the battery and even if ignition or explosion occurs, minimize its degree of risk.

According to another aspect of the present disclosure, even if a car accident occurs, the control unit does not determine the situation is dangerous when a voltage and/or a charge capacity of the battery is less than a predetermined reference. Thus, unnecessary operation of the safety apparatus may be prevented.

Also, when the output and/or the charge capacity of the battery is less than the predetermined reference after the operation of the cooling device, the control unit stops the operation of the cooling device to prevent the battery from being consumed any longer. Thereby, after the accident, a car user may control the vehicle using the remaining charge amount of the battery. Thus, subsequent processing after the car accident may be easily carried out.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
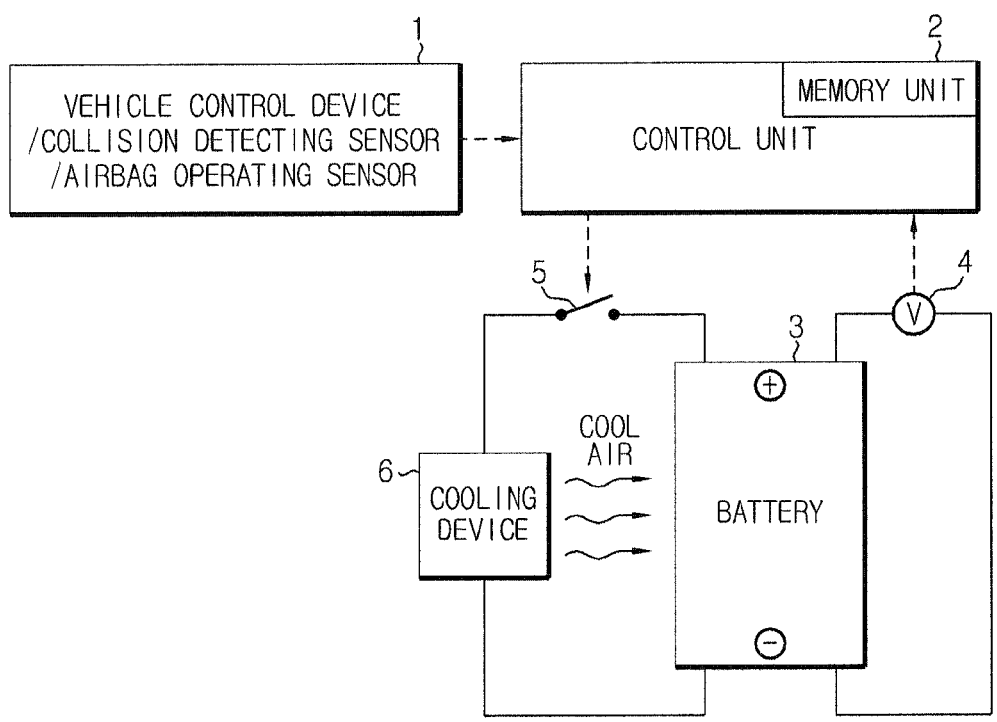
FIG. 1 is a block diagram schematically illustrating a structure of a battery safety apparatus according to an exemplary embodiment of the present disclosure.

FIG. 1 is a block diagram schematically illustrating a structure of a battery safety apparatus according to an exemplary embodiment of the present disclosure.

Referring to FIG. 1, the battery safety apparatus 10 according to an exemplary embodiment of the present disclosure includes a voltage sensor unit 4, a switch unit 5, a control unit 2, and a cooling device 6.

The voltage sensor unit 4 measures the voltage of a battery 3 mounted in a vehicle and outputs a voltage measurement value to the control unit 2.

The battery 3 includes at least one secondary battery cell, and the secondary battery cell is not limited to a particular type. Each secondary battery cell may construct a lithium ion battery, a lithium polymer battery, a nickel cadmium battery, a nickel hydrogen battery and a nickel zinc battery that are rechargeable and need to consider a charge or discharge voltage. Also, a number of secondary battery cells included in the battery 3 may be variously set based on a required output voltage or charge/discharge capacity. However, the present disclosure is not limited by a type, an output voltage and a charge capacity of the secondary battery cell, and the like. Also, the present disclosure is not limited by a method of connecting the secondary battery cells.

The voltage measurement value measured by the voltage sensor unit 4 may be used as a parameter for estimating a voltage and/or a charge capacity (State Of Charge; SOC) of the battery 3. Generally, the voltage of the battery 3 and the voltage and the charge capacity of the battery 3 have a proportional relationship, and various techniques that estimate the voltage and the charge capacity of the battery 3 using the voltage of the battery 3 are well known in the art. For example, the voltage and the charge capacity of the battery 3 may be estimated using a method which makes a reference to a lookup table in which the voltage and the charge capacity corresponding to the voltage of the battery 3 is recorded.

The cooling device 6 is electrically connected to both ends of the battery 3 and is supplied with power from the battery 3. Also, the cooling device 6 may operate with the power supplied from the battery 3 to cool the battery 3. That is, the cooling device 6 is electrically connected to the battery 3 to be cooled, to not only cool the battery 3 but also discharge the battery 3.

The cooling device 6 may employ various cooling means.

As an example, the cooling device 6 may be equipped with a cooling fan. The cooling fan may be either configured to provide cool air to the battery 3 or suck air near the heated battery 3 and release it outside, or both.

As another example, the cooling device 6 may be equipped with a thermoelectric element. The thermoelectric element refers to a semiconductor element which emits cool air by the Feltier effect when an electric current flows. Here, the Feltier effect represents a phenomenon in which when an electric current flows in a circuit consisting of different two conductors, one side of a joint of the different conductors is heated while the other side is cooled based on a direction of the electric current. Thus, a hot air emitting side and a cool air emitting side exist in the thermoelectric element. Preferably, the thermoelectric element is configured such that the cool air emitting direction faces the battery 3.

As still another example, the cooling device 6 may be equipped with both the cooling fan and the thermoelectric element.

Figure 2:
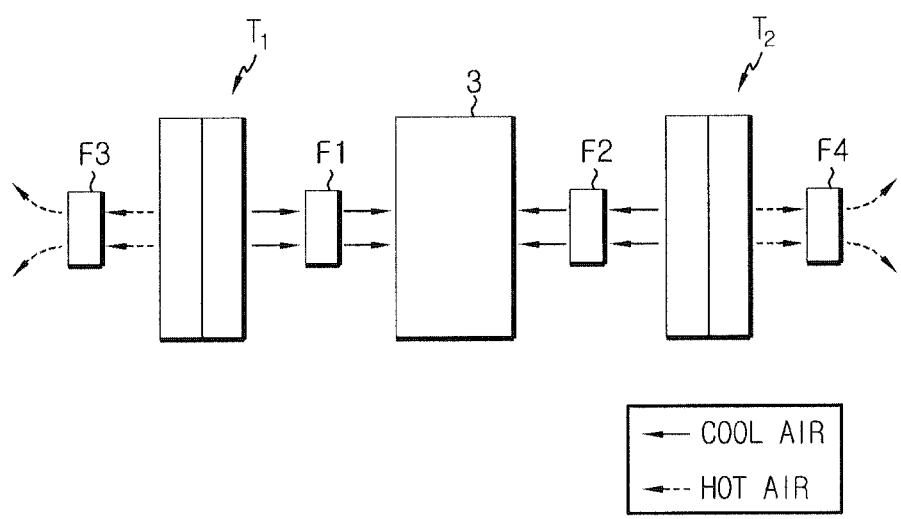
FIG. 2 is a diagram illustrating a structure of a cooling device according to an exemplary embodiment of the present disclosure.

FIG. 2 is a diagram illustrating a structure of the cooling device according to an exemplary embodiment of the present disclosure.

Referring to FIG. 2, the cooling device 6 according to an exemplary embodiment of the present disclosure includes four cooling fans F1~F4 and two thermoelectric elements T1 and T2. The two thermoelectric elements T1 and T2 are provided at both sides of the battery 3 and configured to emit cool air (indicated by a solid line in FIG. 2) in a direction facing the battery 3 and hot air (indicated by a dotted line in FIG. 2) in a direction away from the battery 3. Among the four cooling fans F1~F4, two cooling fans F1 and F2 are each provided between the battery 3 and the thermoelectric elements T1 and T2 to cool the battery 3, and at the same time, quickly provide the battery 3 with cool air emitting from the thermoelectric elements T1 and T2.

Among the four cooling fans F1~F4, the remaining two cooling fans F3 and F4 are provided at the outside of the two thermoelectric elements T1 and T2, respectively, to release hot air emitting from the thermoelectric elements T1 and T2 outside. According to this construction, there is an effect of quick cooling of the battery 3 and quick discharge of the battery 3. Preferably, the battery 3 is provided in a chamber or housing isolated from the outdoor air, so cool air may be provided to the battery 3 and hot air may be released outside the chamber.

In this instance, the above construction of the cooling device 6 is just an example, and it is obvious that various cooling means may be employed as the cooling device 6 of the present disclosure.

The switch unit 5 is electrically connected between the cooling device 6 and the battery 3. Also, the switch unit 5 is turned ON or OFF by a control signal outputted from the control unit 2. That is, the switch unit 5 is selectively turned ON or OFF in response to a command of the control unit 2 to electrically connect the cooling device 6 to the battery 3 or release the electrical connection of the cooling device 6 and the battery 3.

When a collision value inputted from the outside is higher than or equal to a preset reference collision value and a voltage value received from the voltage sensor unit 4 is higher than or equal to a preset reference voltage value, the control unit 2 outputs a control signal to turn on the switch unit 5.

The control unit 2 compares the collision value inputted from the outside to the preset reference collision value to determine whether a vehicle collision has occurred. As a result of the comparison, when the inputted collision value is higher than or equal to the preset reference collision value, the control unit 2 may determine that a vehicle collision has occurred. Here, the reference collision value may be set in consideration of characteristics of the vehicle, a collision amount at the time of collision, durability of the battery 3, and the like.

Also, the control unit 2 may receive an input of the collision value from the outside by various methods.

As an example, the collision value inputted from the outside may be outputted from a vehicle control device. The vehicle control device corresponds to a main control unit which receives a signal from a sensor mounted in the vehicle and does an electronic control in response thereto.

As another example, the collision value inputted from the outside may be outputted from a collision detecting sensor attached to the vehicle. The collision detecting sensor is, for example, a sensor attached to the vehicle and used to operate an airbag or an acceleration sensor.

As another example, the collision value inputted from the outside may be outputted from an airbag operating sensor attached to the vehicle. It is because an impact enough to operate an airbag attached to the vehicle may be transmitted to the battery 3.

Also, the control unit 2 compares the voltage value received from the voltage sensor unit 4 to the preset reference voltage value. Here, the preset reference voltage value may be set in consideration of a risk of ignition or explosion of the battery 3. Because a high voltage value of the battery 3 implies that the battery 3 is in a high voltage and/or high capacity state, the voltage value of the battery 3 may be an index indicating concern about an explosion of the battery 3 and a degree of risk at the time of explosion. Thus, the reference voltage value may be set in consideration of a risk of ignition or explosion of the battery 3.

As a result of comparing the collision value inputted from the outside to the preset reference collision value, when the collision value inputted from the outside is higher than the preset reference collision value, the control unit 2 determines that a vehicle collision has occurred. Its description is as above. Also, in the case where the control unit 2 determines that a vehicle collision has occurred, when the voltage value received from the voltage sensor unit 4 is higher than or equal to the preset reference voltage value, the control unit 2 outputs a control signal to turn on the switch unit 5.

That is, the control unit 2 does not operate the cooling device 6 by the only reason of vehicle collision, and when the control unit 2 identifies a dangerous situation where the voltage of the battery 3 is higher than or equal to the predetermined reference, the control unit 2 operates the cooling device 6.

Similarly, when the voltage value received from the voltage sensor unit 4 is less than or equal to the preset reference voltage value after the control unit 2 turns on the switch unit 5, the control unit 2 turns off the switch unit 5. That is, when the battery 3 is sufficiently discharged after the control unit 2 identifies a dangerous situation and operates the cooling device 6, the control unit 2 may stop the operation of the cooling device 6. This is because the battery 3 is sufficiently discharged by the operation of the cooling device 6, a risk of ignition or explosion of the battery 3 reduces, and there is no need to discharge the battery 3 any longer. Also, for subsequent processing after the vehicle accident, it is preferred to leave a minimum amount of charge of the battery 3. If the battery 3 of the vehicle is fully discharged after the vehicle accident, there is a problem with non-self-operation of the vehicle and the need for tow-away.

The preset reference voltage value may be set differently in a value used in the control for turning on the switch and a value used in the control for turning off the turned-on switch. Those skilled in the art may set a proper level of reference voltage value through experiments or simulation.

The battery safety apparatus 10 according to the present disclosure may further include a memory unit. The memory unit may store the reference collision value and the reference voltage value.

The memory unit may be inside or outside of the control unit 2, and may be connected to the control unit 2 with a variety of well-known means. The memory unit is a high-capacity storage medium such as a semiconductor device or hard disk that is known as being capable of recording and erasing data, for example, random access memory (RAM), read-only memory (ROM), electrical erasable programmable read-only memory (EEPROM), and the like, and encompasses any device capable of storing information regardless of a device type and is not limited to a specific memory device In the description of the present disclosure, it should be understood that each element of the battery safety apparatus according to the present disclosure is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A battery safety apparatus comprising:
a voltage sensor unit to measure a voltage of a battery mounted in a vehicle;
a cooling device connected to both ends of the battery and supplied with power from the battery to cool the battery;
a switch unit connected between the cooling device and the battery and turning on or off by a control signal; and a control unit to output a control signal to turn on the switch unit when a collision value inputted from the outside is higher than or equal to a preset reference collision value and a voltage value received from the voltage sensor unit is higher than or equal to a preset reference voltage value.

2. The battery safety apparatus according to claim 1, wherein the cooling device cools the battery and at the same time discharges the battery.

3. The battery safety apparatus according to claim 1, wherein the cooling device includes a cooling fan.

4. The battery safety apparatus according to claim 1, wherein the cooling device includes a thermoelectric element.

5. The battery safety apparatus according to claim 4, wherein the thermoelectric element is disposed such that a cool air emitting side faces the battery.

6. The battery safety apparatus according to claim 1, wherein the collision value inputted from the outside is outputted from a vehicle control device.

7. The battery safety apparatus according to claim 1, wherein the collision value inputted from the outside is outputted from a collision detecting sensor attached to the vehicle.

8. The battery safety apparatus according to claim 1, wherein the collision value inputted from the outside is outputted from an airbag operating sensor attached to the vehicle.

9. The battery safety apparatus according to claim 1, wherein the control unit turns off the switch unit when the voltage value received from the voltage sensor unit is less than or equal to the preset reference voltage value after the control unit turns on the switch unit.

10. The battery safety apparatus according to claim 1, further comprising:
    a memory unit to store the reference collision value and the reference voltage value.

\* \* \* \* \*